(12) United States Patent
Showkathali et al.

(10) Patent No.: US 10,851,920 B2
(45) Date of Patent: Dec. 1, 2020

(54) PIPE CONNECTION

(71) Applicant: CRANE LIMITED, Hitchin (GB)

(72) Inventors: Asif Hassan Showkathali, Letchworth (GB); Brian Rex, Hitchin (GB)

(73) Assignee: Crane Limited, Hitchin (GB)

( * ) Notice: Subject to any disclaimer, the term of this patent is extended or adjusted under 35 U.S.C. 154(b) by 975 days.

(21) Appl. No.: 14/904,252

(22) PCT Filed: Jul. 9, 2014

(86) PCT No.: PCT/EP2014/064771
§ 371 (c)(1),
(2) Date: Jan. 11, 2016

(87) PCT Pub. No.: WO2015/004215
PCT Pub. Date: Jan. 15, 2015

(65) Prior Publication Data
US 2016/0153592 A1    Jun. 2, 2016

(30) Foreign Application Priority Data

Jul. 9, 2013 (GB) .................................. 1312284.1

(51) Int. Cl.
*F16L 21/04* (2006.01)
*F16L 21/08* (2006.01)

(52) U.S. Cl.
CPC ............. *F16L 21/045* (2013.01); *F16L 21/04* (2013.01); *F16L 21/08* (2013.01)

(58) Field of Classification Search
CPC .......... F16L 21/045; F16L 21/04; F16L 21/08
See application file for complete search history.

(56) References Cited

U.S. PATENT DOCUMENTS 2,197,450 A * 4/1940 Curtis ................... F16L 21/045
277/621
4,538,841 A * 9/1985 Royston .................. F16L 21/04
285/337

(Continued)

FOREIGN PATENT DOCUMENTS

| EP | 0 899 495 A2 | 3/1999 |
| GB | 2 346 422 A | 8/2000 |
| JP | 2013 133857 A | 7/2013 |

OTHER PUBLICATIONS

International Search Report and Written Opinion for corresponding Patent Application No. PCT/EP2014/064771 dated Sep. 18, 2014.

*Primary Examiner* — David Bochna
*Assistant Examiner* — James A Linford
(74) *Attorney, Agent, or Firm* — Renner, Otto, Boisselle & Sklar, LLP

(57) ABSTRACT

A pipe connection (101*a*, 101*b*) for providing a connection to a pipe, the pipe connection comprising: a sleeve (103) which receives a pipe and has a seat (109); a first sealing or gripping element (111) which is disposed adjacent the seat; an intermediate member (115) which is disposed adjacent the first sealing or gripping element; a second sealing or gripping element (123) which is disposed adjacent the intermediate member; an end member (131) which is disposed adjacent the second sealing or gripping element; at least one fixing (159) which engages the end member and is configured to displace the same axially inwardly relative to the sleeve on torquing; and at least one support (151, 153) which is disposed between one of the sleeve (103) and the intermediate member (115) or the intermediate member (115) and the end member (131), wherein the at least one support is configured to maintain the sleeve and the intermediate member or the intermediate member and the end member with a predetermined spaced relation until applica- (Continued)

tion of a torquing force between the sleeve and the intermediate member or the intermediate member and the end member which exceeds a predetermined threshold, whereby the end member is displaced relative to the intermediate member to displace the second sealing or gripping element ahead of displacement of the intermediate member relative to the sleeve to displace the first sealing or gripping element or the intermediate member is displaced relative to the sleeve to displace the first sealing or gripping element ahead of displacement of the end member relative to the intermediate member to displace the second sealing or gripping element.

18 Claims, 12 Drawing Sheets

(56) References Cited

U.S. PATENT DOCUMENTS

| | | | |
|---|---|---|---|
| 4,569,542 A | | 2/1986 | Anderson et al. |
| 4,606,565 A | * | 8/1986 | Royston .............. F16L 21/08 285/337 |
| 5,069,490 A | * | 12/1991 | Halen, Jr. ............ F16L 21/04 285/337 |
| 5,100,183 A | | 3/1992 | Montesi et al. |
| 6,106,029 A | * | 8/2000 | DeMore .............. F16L 21/08 285/104 |
| 6,481,762 B1 | | 11/2002 | Rex et al. |
| 2008/0303223 A1 | | 12/2008 | Nijsen |

* cited by examiner

PIPE CONNECTION

This application is a national phase of International Application No. PCT/EP2014/064771 filed Jul. 9, 2014 and published in the English language, which claims priority to United Kingdom Patent Application No. 1312284.1 filed Jul. 9, 2013, which are hereby incorporated herein by reference in their entirety.

The present invention relates to a pipe connection which provides for a structural and fluid-tight connection to an outside diameter of a pipe, typically being provided in a pipe coupling or flange adaptor, and in particular being for use with plastic pipes, such as PE or PVC pipes, as, for example, used for water applications.

The present applicant has existing pipe coupling and flange adaptor products, which are sold under the Aquafast® brand (as supplied by Viking Johnson, Hitchin, UK). The Aquafast product, when assembled correctly, will both seal and grip on the outside diameter of a pipe, such as to resist end load forces as created typically by internal pressure, Poisson's effect and temperature changes, and is unique in not requiring a torque wrench to complete the assembly, with the operator being able to determine when to stop torquing by the positional relationship of component parts.

FIG. 1 illustrates an existing Aquafast pipe coupling. In this illustration, the left-hand section of FIG. 1 shows the pipe coupling in an untorqued state and the right-hand section of FIG. 1 shows the pipe coupling in a torqued state.

The pipe coupling comprises first and second pipe connections 1a, b and a coupling 2, which fluidly connects the pipe connections 1a, b.

The pipe connections 1a, b each comprise a sleeve 3, as part of the coupling 2, here an integral part of the coupling, which has an end 5 with an inner peripheral wall 6 and an annular body 7 which extends axially from the end 5 and has an inner peripheral wall 8 with an inner diameter to receive an outside diameter of a pipe P1, P2.

The end 5 of the sleeve 3 has a seat 9, in this embodiment an annular seat, which faces axially outwardly and against which a sealing gasket 11 is biased, as will be described further below.

The pipe connections 1a, b each further comprise a sealing gasket 11, in the form of a double O-ring, which is seated on the seat 9.

The pipe connections 1a, b each further comprise an intermediate ring 15 which is disposed adjacent the sealing gasket 11 and each have a first end face 17 which faces axially inwardly and engages the sealing gasket 11 and a second end face 19 which faces axially outwardly and engages a gripper ring 23, as will be described in more detail below.

The pipe connections 1a, b each further comprise a gripper ring 23 which is disposed adjacent the intermediate ring 15 and has a first face 27 which faces axially inwardly and engages the second end face 19 of the intermediate ring 15, and a second face 29 which faces axially outwardly, being inclined or tapered to the longitudinal axis of the pipe coupling, and engages an end ring 31, as will be described in more detail hereinbelow.

The pipe connections 1a, b each further comprise an end ring 31 which is disposed adjacent the gripper ring 23 and has a face 35 which faces axially inwardly, being inclined or tapered to the longitudinal axis of the pipe coupling, and acts, on torquing of the pipe coupling, to engage the second face 29 of the gripper ring 23 and displace the gripper ring 23 both axially against the second end face 19 of the intermediate ring 15 and radially inwardly, into tight gripping engagement with the outside diameter of the pipe P1, P2.

The pipe coupling further comprises a plurality of fixings 39, each in the form of a connector bolt 41 and a nut 43, which engage respective ones of the end rings 31 and act to displace the same axially towards one another on torquing. As illustrated in the left-hand section of FIG. 1, in an untorqued state, visible gaps exist between the ends 5 of the sleeves 3 and the respective intermediate rings 15 and the intermediate rings 15 and the respective end rings 31. Following torquing, and when installed correctly, as illustrated in the right-hand section of FIG. 1, the gaps between the ends 5 of the sleeves 3 and the respective intermediate rings 15 and the intermediate rings 15 and the respective end rings 31 are substantially closed, which provides the operator with a direct visual check of correct installation.

Whilst the Aquafast product provides an effective seal and grip on the outside diameter of a pipe P1, P2, the present inventors have recognized that use of the Aquafast product can suffer from a problem associated with the gripper ring 23 prematurely grabbing the outside diameter of the pipe P1, P2, either during the initial presentation of the product to the pipe P1, P2 or during the final bolt-torquing process.

In relation to the problem arising from the initial presentation, this problem arises as a result of the effectiveness of the grip as achieved by the gripper ring 23. Usually, the connection is slid over the end of the pipe P1, P2 in to position, but premature and keen gripping during this phase, as caused by inadvertent manual pressure being applied to the end ring 31 and consequent compression of the gripper ring 23, prevents the installer from correctly axially positioning the connection. In this circumstance, the installer will have to dismantle the assembly into component form and reassemble in the correct location, which can lead to poor assembly and the risk of damage to the components.

In relation to the problem arising in the final bolt-torquing process, this problem arises as a result of early gripping during tightening of the fixings 39. In normal operation, when the connection is axially and correctly located on the pipe P1, P2 and the bolts and nuts 41, 43 of the fixings 39 are tightened, the sealing gasket 11 is first drawn down to create a seal and then the gripper ring 23 is subsequently drawn down to create the grip. In some circumstances, the gripper ring 23 can reach the pipe P1, P2 before the sealing gasket 11, and further tightening acts only to create a firmer grip at the gripper ring 23 without any further displacement of the sealing gasket 11. This problem is made worse where the pipes P1, P2 are restricted from moving axially, such that the gripper ring is restricted by the pipe P1, P2 from being moved axially and hence the intermediate ring 15 cannot be displaced axially to compress the sealing gasket 11. The resulting reduced pressure at the sealing gasket 11 can cause leakage, even though the fixings 39 have a high torque.

It is thus an aim of the present invention to provide a pipe connection which overcomes or at least partially alleviates the problems which the present inventors have recognized in relation to the Aquafast product.

In one aspect the present invention provides a pipe connection for providing a connection to a pipe, the pipe connection comprising: a sleeve which receives a pipe and has a seat; a first sealing or gripping element which is disposed adjacent the seat; an intermediate member which is disposed adjacent the first sealing or gripping element; a second sealing or gripping element which is disposed adjacent the intermediate member; an end member which is disposed adjacent the second sealing or gripping element; at least one fixing which engages the end member and is configured to displace the same axially inwardly relative to the sleeve on torquing; and at least one support which is disposed between one of the sleeve and the intermediate member or the intermediate member and the end member, wherein the at least one support is configured to maintain the sleeve and the intermediate member or the intermediate member and the end member with a predetermined spaced relation until application of a torquing force between the sleeve and the intermediate member or the intermediate member and the end member which exceeds a predetermined threshold, whereby the end member is displaced relative to the intermediate member to displace the second sealing or gripping element ahead of displacement of the intermediate member relative to the sleeve to displace the first sealing or gripping element or the intermediate member is displaced relative to the sleeve to displace the first sealing or gripping element ahead of displacement of the end member relative to the intermediate member to displace the second sealing or gripping element.

In one embodiment the seat faces axially outwardly, the intermediate member has a first face which faces axially inwardly and engages the first sealing or gripping element and a second face which faces axially outwardly and engages the second sealing or gripping element, and the end member has a face which faces axially inwardly and engages the second sealing or gripping element.

In one embodiment the first sealing or gripping element is a sealing element, optionally a sealing gasket, which provides for sealing engagement with the pipe.

In one embodiment the second sealing or gripping element is a sealing element, optionally a sealing gasket, which provides for sealing engagement with the pipe.

In one embodiment the first sealing or gripping element is a gripping element, optionally a gripper ring, which provides for gripping engagement with the pipe.

In one embodiment the second sealing or gripping element is a gripping element, optionally a gripper ring, which provides for gripping engagement with the pipe.

In one embodiment the at least one support is disposed between the intermediate member and the end member, wherein the at least one support is configured to maintain the intermediate member and the end member with a predetermined spaced relation until application of a torquing force between the intermediate member and the end member which exceeds a predetermined threshold, whereby the intermediate member is displaced relative to the sleeve to displace the first sealing or gripping element ahead of displacement of the end member relative to the intermediate member to displace the second sealing or gripping element.

In one embodiment the at least one support is configured to shorten axially when a torquing force is applied thereto which exceeds a predetermined threshold.

In one embodiment the at least one support is a deformable structure.

In one embodiment the at least one support is configured to collapse on application of a predetermined torquing force thereto.

In one embodiment the at least one support is configured to buckle on application of a predetermined torquing force thereto.

In one embodiment the at least one support comprises at least one strut which buckles on the application of a force which is greater than a predetermined value.

In one embodiment the strut extends in substantially-parallel relation to a force applied by the at least one fixing.

In one embodiment the at least one strut includes a weakened section so as to ensure that the at least one strut collapses in a controlled manner.

In one embodiment the at least one support comprises a plurality of struts arranged in spaced relation.

In one embodiment the struts are arranged in spaced, parallel relation about part of a periphery of the intermediate member.

In one embodiment the pipe connection comprises: a plurality of supports which are disposed to sides of the intermediate member.

In one embodiment the at least one support comprises a body member from which extends one end of the struts, with the other ends of the struts being unconnected.

In another embodiment the at least one support comprises a body member from which extends the at least one strut.

In one embodiment the at least one support comprises first and second body members between which extend the at least one strut.

In one embodiment the or each body member comprises a part-annular ring.

In one embodiment each body member has the form of an annular ring through which the respective fixing extends so as to hold the support captive.

In another embodiment each body member has an open section and allows for fitting of the at least one support subsequent to the fitting of the at least one fixing.

In one embodiment the body member includes at least one detent which allows for a snap fit of the at least one support to the at least one fixing, with the at least one support being retained captive by the at least one detent.

In one embodiment the at least one support is formed as an integral component, optionally a moulded plastics component.

In one embodiment the at least one support comprises a slideable structure.

In one embodiment the at least one support comprises first and second parts which are configured to allow for relative displacement only when a force, as achieved by torquing the pipe connection, exceeds a predetermined threshold.

In one embodiment the parts are slideably coupled with an interference fit and require the application of a predetermined force to cause sliding of the same.

In one embodiment the parts have the form of a spigot and socket arrangement, optionally in the form of sleeves.

In another embodiment the at least one support comprises a compressible material, optionally a foamed or honeycomb material.

In one embodiment the seat encloses an acute angle with an outside diameter of a pipe, such that, on torquing the pipe connection, the first sealing or gripping element is driven into engagement with an outside diameter of the pipe.

In one embodiment the intermediate member encloses an obtuse angle with an outside diameter of a pipe, such that, on torquing the pipe connection, the first sealing or gripping element is driven outwardly into engagement with an inner peripheral wall of an end of the sleeve.

In one embodiment the intermediate member includes at least one radial projection which engages the at least one support.

In one embodiment the at least one radial projection is provided by an annular flange.

In one embodiment the end member encloses an acute angle with an outside diameter of a pipe, such that, on torquing the pipe connection, the second sealing or gripping element is driven radially inwardly into engagement with an outer diameter of the pipe.

In one embodiment the pipe connection comprises: a plurality of supports which are disposed between the sleeve and the intermediate member or the intermediate member and the end member.

In one embodiment the supports are located around or adjacent the at least one fixing.

In another embodiment the supports are disposed intermediate the fixings.

In one embodiment the at least one fixing comprises a connector bolt and a nut.

In one embodiment the at least one support is configured to shorten at a predeterminable rate so as to maintain a load on one of the first sealing or gripping element or the second sealing or gripping element during subsequent displacement of the other of the first sealing or gripping element or the second sealing or gripping element.

In one embodiment the at least one support is configured to shorten at a predeterminable rate so as to maintain a load on the first sealing or gripping element during subsequent displacement of the second sealing or gripping element.

In one embodiment the at least one support is configured to provide a varying resistance during shortening.

In one embodiment the at least one support presents a reducing resistance in relation to an extent of shortening or a reduced resistance following a predetermined extent of shortening, whereby the first sealing or gripping element or the second sealing or gripping element maintains engagement with the pipe during subsequent torquing of the pipe connection to displace the other of the first sealing or gripping element or the second sealing or gripping element.

In one embodiment the intermediate member comprises an intermediate ring.

In one embodiment the end member comprises an end ring.

In one embodiment one or both of the first sealing or gripping element or the second sealing or gripping element comprises a double O-ring.

In another aspect the present invention provides a pipe connection for providing a connection to a pipe, the pipe connection comprising: a sleeve which has an end with an inner peripheral wall and an annular body which extends axially from the end and has an inner peripheral wall with an inner diameter to receive an outside diameter of a pipe, the end of the sleeve having a seat which faces axially outwardly; a sealing gasket which is disposed adjacent the seat; an intermediate ring which is disposed adjacent the sealing gasket and has a first end face which faces axially inwardly and engages the sealing gasket and a second end face which faces axially outwardly; a gripper ring which is disposed adjacent the intermediate ring and has a first face which faces axially inwardly and engages the second face of the intermediate ring and a second face which faces axially outwardly; an end ring which is disposed adjacent the gripper ring and has a face which faces axially inwardly and is operative to displace the gripper ring both axially inwardly against the second face of the intermediate ring and radially inwardly into tight gripping engagement with an outside diameter of a pipe; at least one fixing which engages the end ring and is configured to displace the same axially inwardly relative to the sleeve on torquing; and at least one support which is disposed between the intermediate ring and the end ring, wherein the at least one support is configured to maintain the intermediate ring and the end ring with a predetermined spaced relation until application of a torquing force between the intermediate ring and the end ring which exceeds a predetermined threshold, whereby the intermediate ring is displaced relative to the sleeve to displace the sealing gasket ahead of displacement of the end ring relative to the intermediate ring to displace the gripper ring.

In a further aspect the present invention provides a pipe coupling, comprising: first and second pipe connections as above described; and a coupling which fluidly connects the pipe connections.

In one embodiment the at least one fixing extends between the end members of the pipe connections.

In another embodiment the pipe coupling comprises: a plurality of fixings, wherein at least one fixing extends between the sleeve and the end member of each pipe connection.

In a still further aspect the present invention provides a flange adaptor, comprising: a pipe connection as above described; and a flange which is connected to the sleeve of the pipe connection.

In one embodiment the at least one fixing extends between the end member of the pipe connection and the flange.

In another embodiment the at least one fixing extends between the sleeve and the end member of the pipe connection.

Preferred embodiments of the present invention will now be described hereinbelow by way of example only with reference to the accompanying drawings, in which:

FIGS. 2 to 6 illustrate a pipe coupling in accordance with a first embodiment of the present invention.

Figure 1:
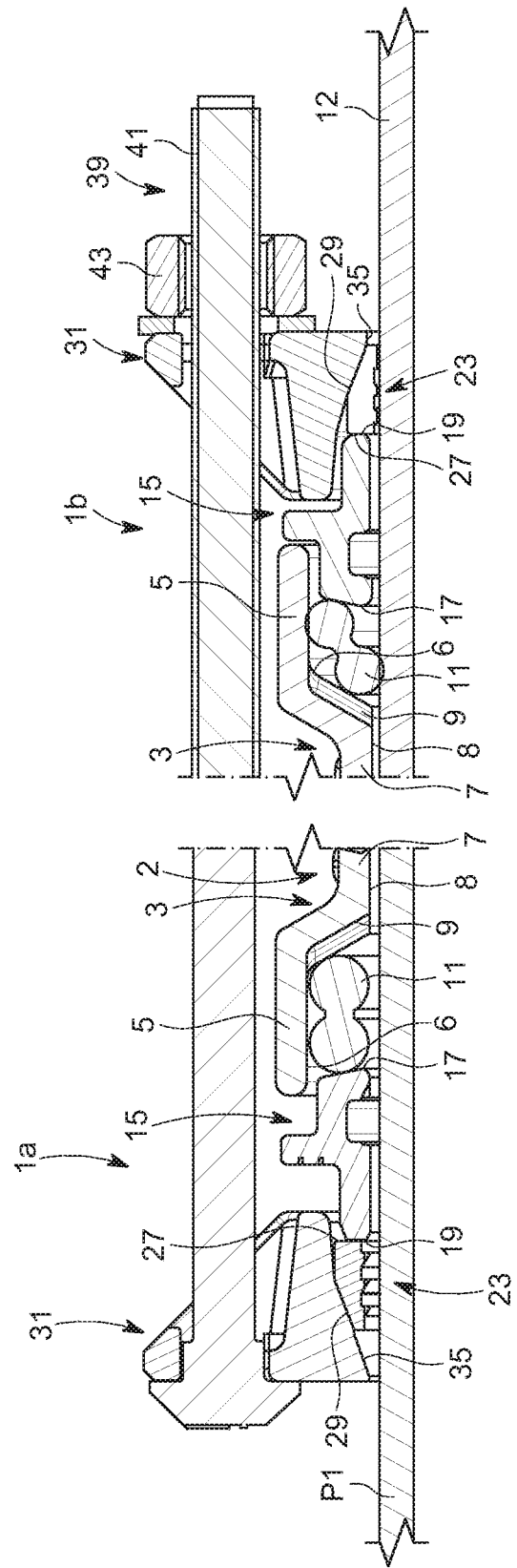
FIG. 1 illustrates a prior art pipe coupling.
Figure 2:
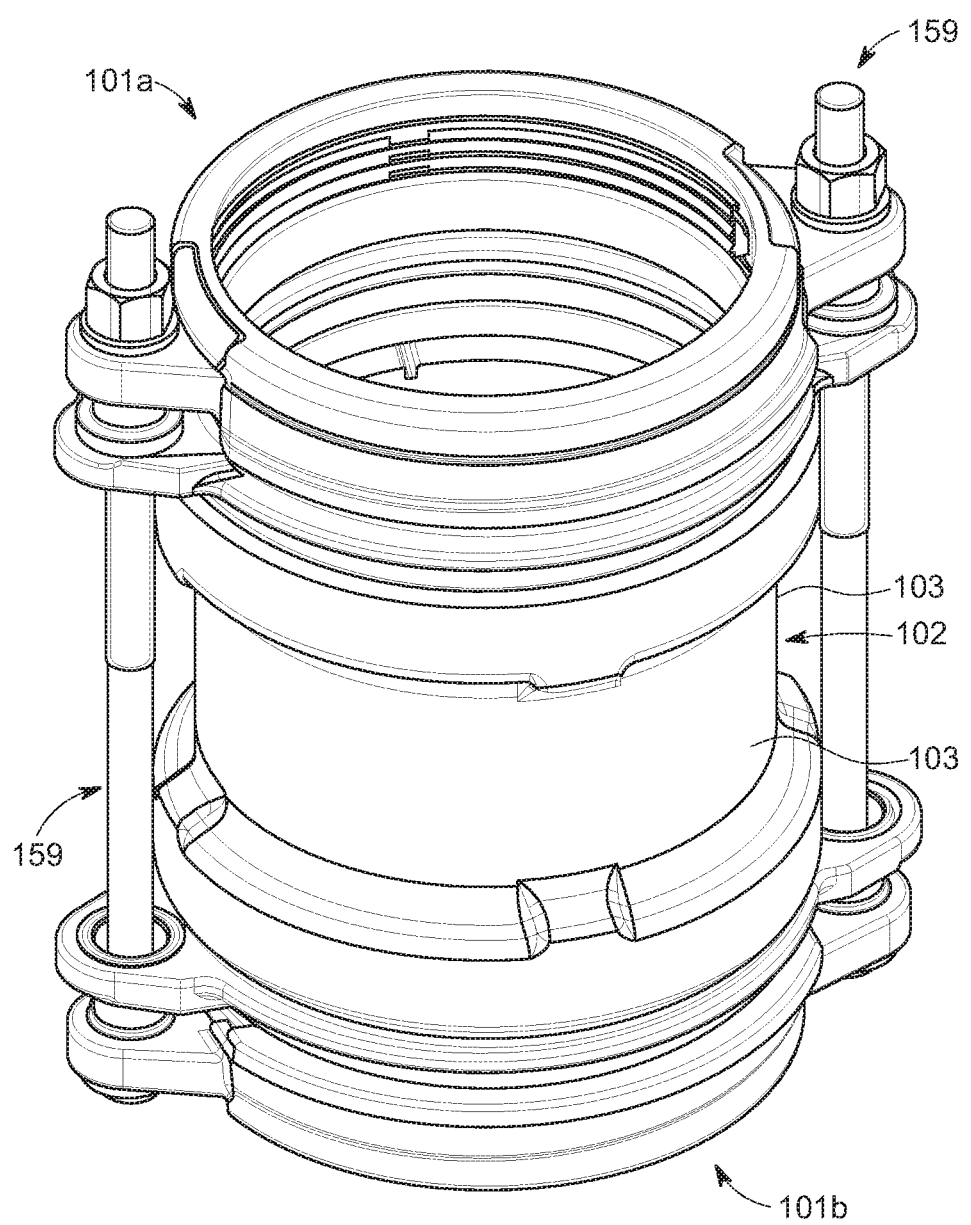
FIG. 2 illustrates a perspective view of a pipe coupling in accordance with a first embodiment of the present invention.

The pipe coupling comprises first and second pipe connections 101a, b and a coupling 102, which fluidly connects the pipe connections 101a, b.

The pipe connections 101a, b each comprise a sleeve 103, as part of the coupling 102, here an integral part of the coupling 102, which has an end 105 with an inner peripheral wall 106 and an annular body 107 which extends axially from the end 105 and has an inner peripheral wall 108 with an inner diameter to receive an outside diameter of a pipe.

The end 105 of the sleeve 103 has a seat 109, in this embodiment an annular seat, which faces axially outwardly and against which a sealing element or gasket 111 is biased, as will be described further below.

In this embodiment the seat 109 encloses an acute angle with an outside diameter of a fitted pipe, such that, on torquing the pipe connection 101a, b, the sealing element or gasket 111 is driven into tight sealing engagement with the outside diameter of the pipe.

The pipe connections 101a, b each further comprise a sealing element or gasket 111, in the form of a double O-ring, which is seated on the annular seat 109.

The pipe connections 101a, b each further comprise an intermediate member or ring 115 which is disposed adjacent the sealing element or gasket 111 and has a first end face 117 which faces axially inwardly and engages the sealing element or gasket 111 and a second end face 119 which faces axially outwardly and engages a gripping element or ring 123, as will be described in more detail below.

In this embodiment the first end 117 of the intermediate member or ring 115 encloses an obtuse angle with an outside diameter of a fitted pipe, such that, on torquing the pipe connection, the sealing element or gasket 111 there adjacent is driven outwardly into tight sealing engagement with the inner peripheral wall 106 of the end 105 of the sleeve 103.

In this embodiment the intermediate member or ring 115 includes at least one, here a plurality of radial projections 122, which each engage a support 151, as will be described in more detail below.

The pipe connections 101a, b each further comprise a gripping element or ring 123 which is disposed adjacent the intermediate member or ring 115 and has a first face 127 which faces axially inwardly and engages the second end face 119 of the intermediate member or ring 115, and a second face 129 which faces axially outwardly and engages an end member or ring 131, as will be described in more detail below.

In this embodiment the second face 129 is inclined or tapered to the longitudinal axis of the pipe connection 101a, b, such as to have a component facing axially outwardly and a component facing radially outwardly.

The pipe connections 101a, b each further comprise an end member or ring 131 which is disposed adjacent the gripping element or ring 123 and has a face 135 which faces axially inwardly.

In this embodiment the face 135 is inclined or tapered to the longitudinal axis of the pipe connection 101a, b, such as to have a component facing axially inwardly and a component facing radially inwardly.

With this arrangement, on torquing of the pipe connection 101a, b, the face 135 acts to engage the second face 129 of the gripping element or ring 123 and displace the gripping element or ring 123 both axially inwardly against the second end face 119 of the intermediate member or ring 115 and radially inwardly, into tight gripping engagement with the outside diameter of a fitted pipe.

The pipe connections 101a, b each further comprise at least one, in this embodiment a plurality of supports 151 which are disposed between the intermediate member or ring 115 and the end member or ring 131 and act to maintain the intermediate member or ring 115 and the end member or ring 131 in a predetermined spaced relation until a predetermined torque is applied during torquing of the pipe connection 101a, b, and in this embodiment are configured to ensure that the intermediate member or ring 115 is displaced relative to the sleeve 103 in order to compress the sealing element or gasket 111 ahead of displacement of the end member or ring 131 relative to the intermediate member or ring 115.

In this embodiment the supports 151 each comprise first and second parts 153, 155 which are configured to allow for relative displacement only when a force, as achieved by torquing the pipe connection 101a, b, exceeds a predetermined threshold.

In this embodiment the parts 153, 155 are slideably coupled with an interference fit, such as to require the application of a predetermined force to cause sliding of the same.

In this embodiment the supports 151 are configured to collapse at a predetermined rate so as to maintain a load on the sealing element or gasket 111 during collapse of the gripping element or ring 123 onto a pipe.

In one embodiment the supports 151 can be configured, such as by profiling, to offer a wide range of collapse forces.

In one embodiment the supports 151 can be configured, such as by profiling, to present a variable resistance during collapse, in one embodiment a reducing resistance in relation to an extent of collapse or a reduced resistance following a predetermined extent of collapse.

This arrangement is particularly useful once the sealing element or gasket 111 is fully compressed, as sufficient resistance can be maintained to maintain the sealing element or gasket 111 under compression, and yet, as the torque increases as the gripping element or ring 123 engages with the pipe, the entire loading of the fixings 159 is used to compress the gripping element or ring 123 into the surface of the pipe.

In this embodiment the parts 153, 155 have the form of a spigot and socket arrangement, here in the form of sleeves.

In this embodiment the supports 151 are located around the bolts 161 of the fixings 159, but in alternative embodiments the supports 151 could be located adjacent the fixings 159 or intermediate the fixings 159 at any location.

The pipe coupling further comprises a plurality of fixings 159, each in the form of a connector bolt 161 and a nut 163, which engage the end members or rings 131 of the respective pipe connections 101a, b and act to displace the same axially towards one another on torquing.

Figure 3:
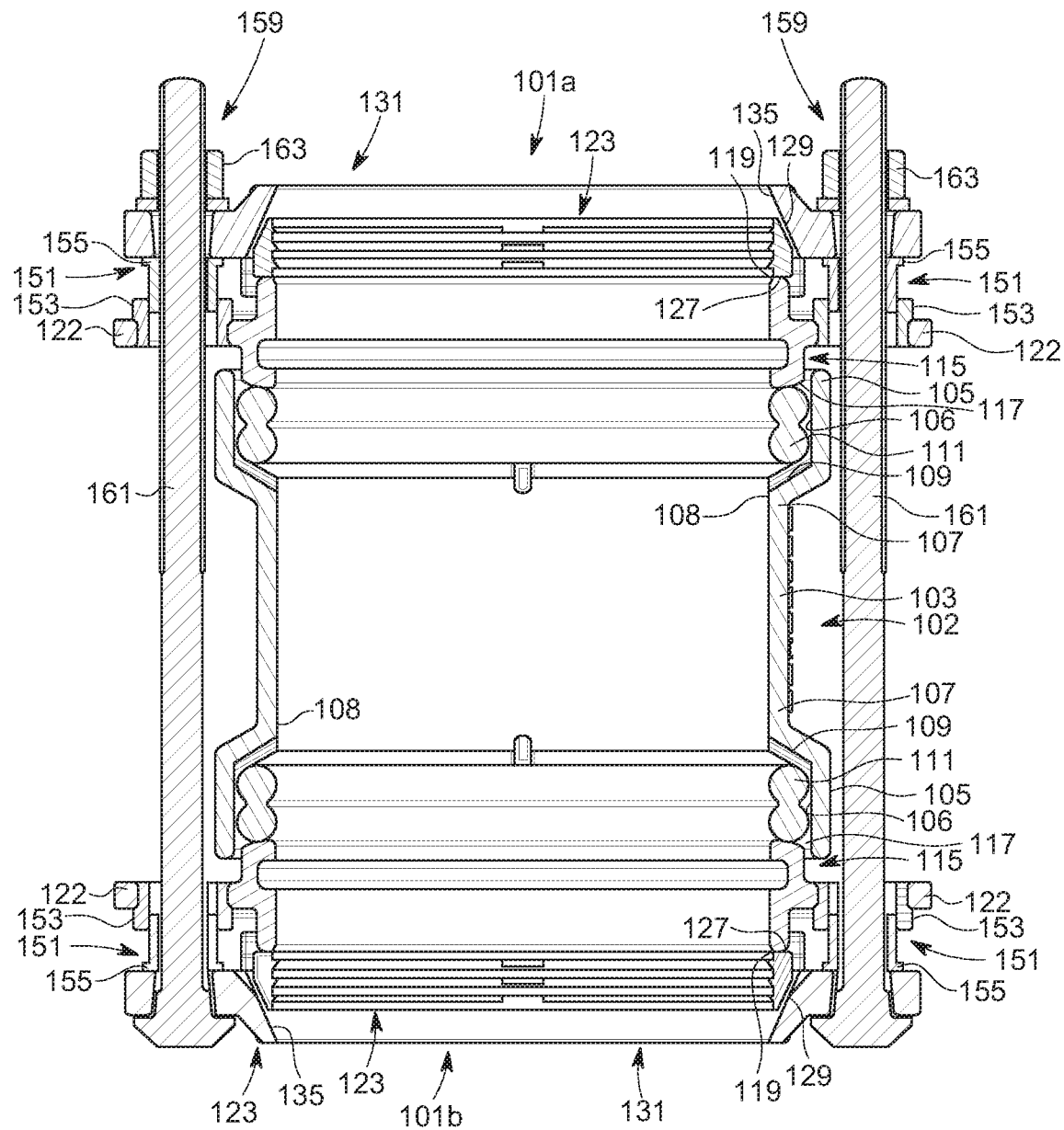
FIG. 3 illustrates a longitudinal sectional view of the pipe coupling of FIG. 2.
Figure 4:
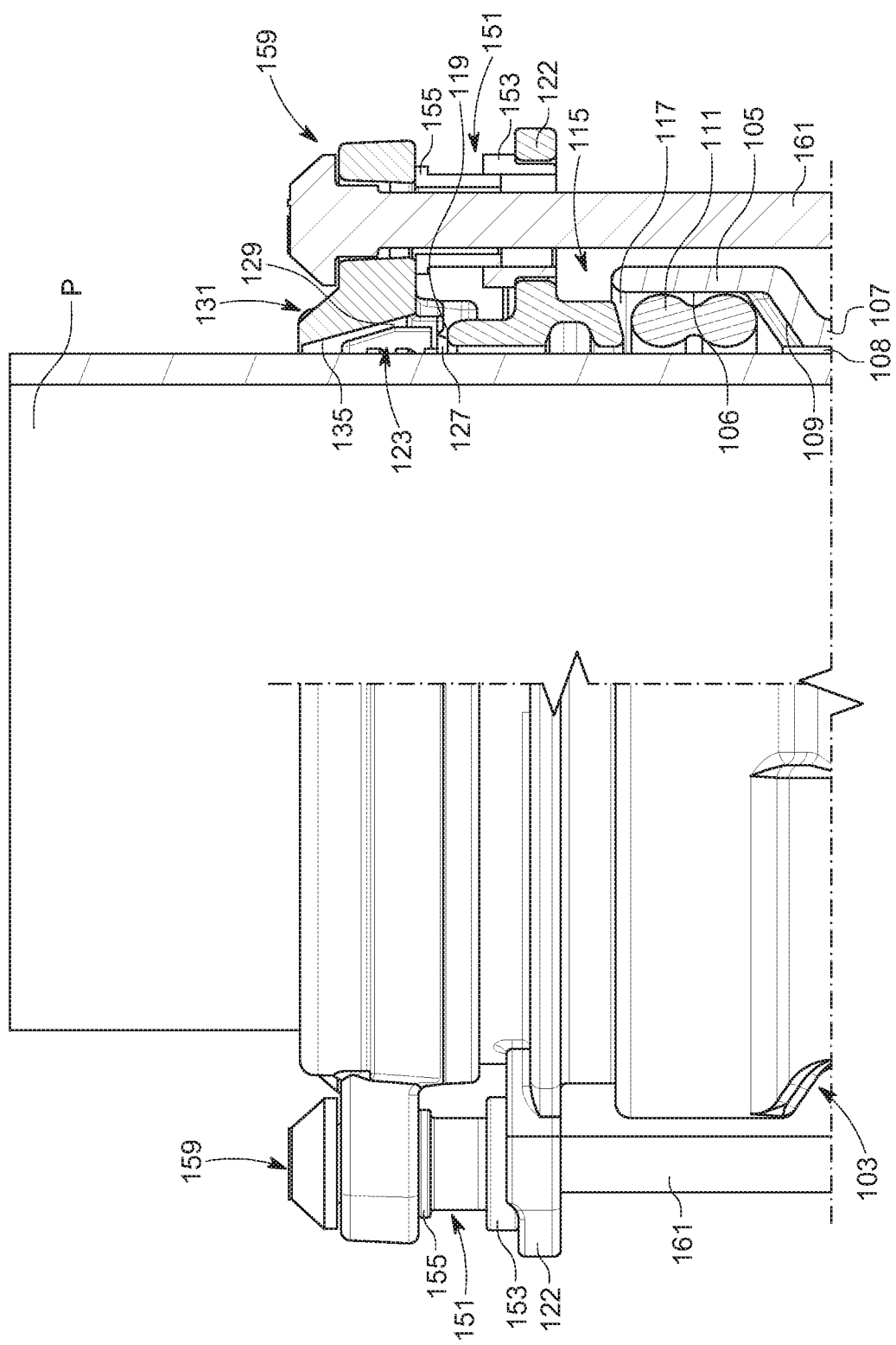
FIGS. 4 to 6 illustrate the operative steps in fitting a pipe to the pipe connection of FIG. 3.
Figure 5:
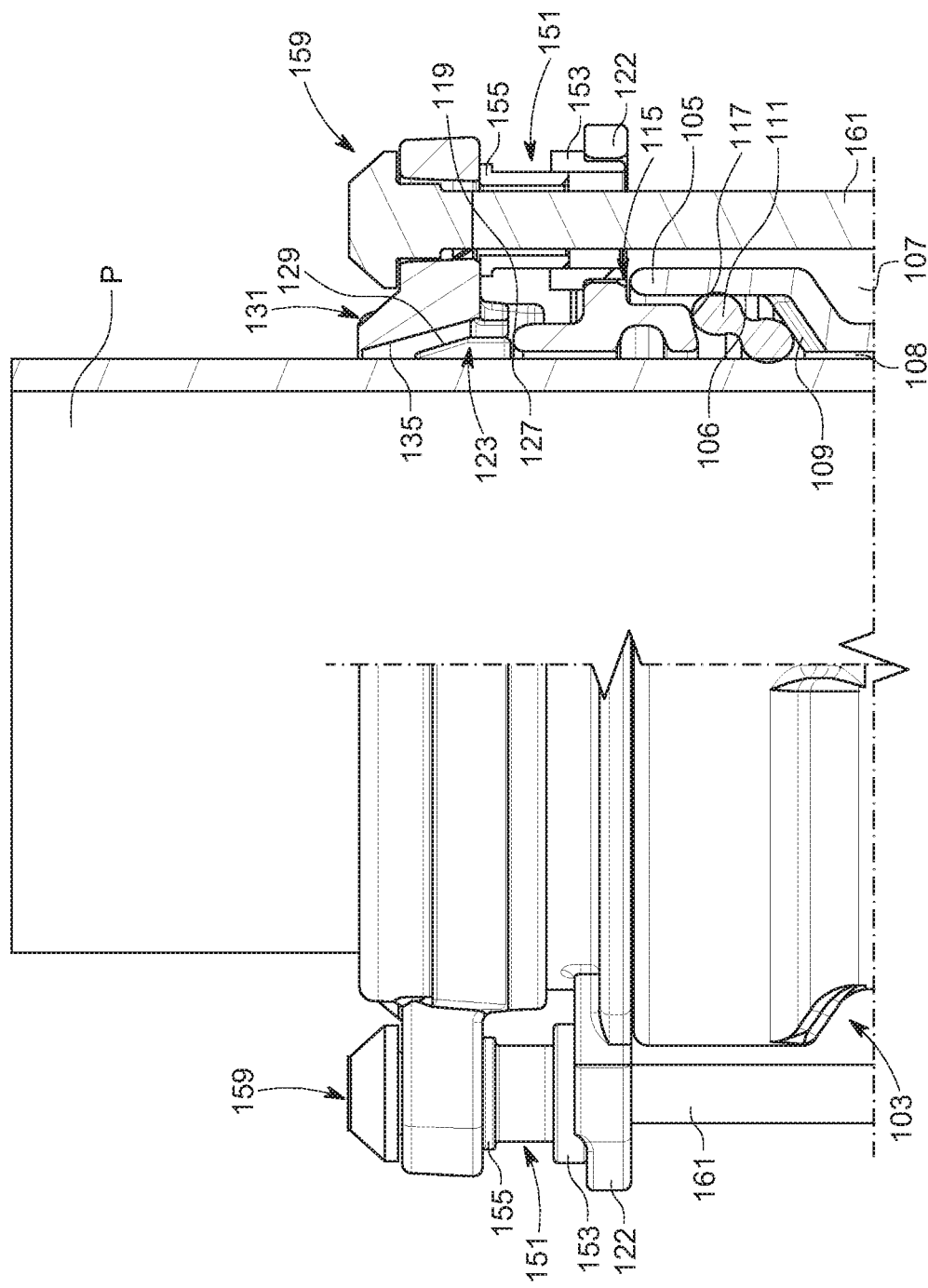
Figure 6:
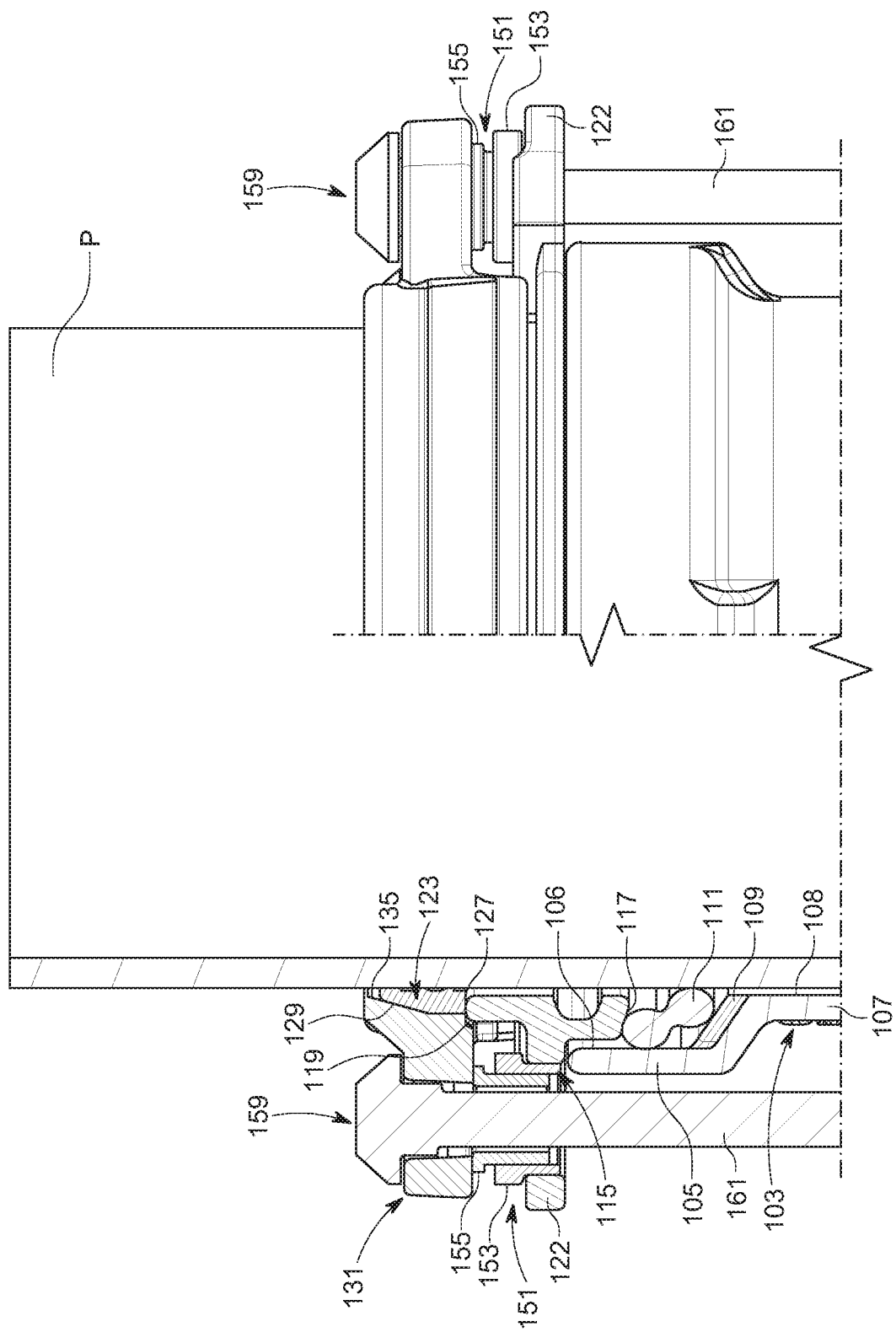

FIGS. 4 to 6 illustrate the operative steps in fitting the pipe coupling of FIG. 3 to pipes P. For ease of illustration, only one of the pipe connections 101a, b is illustrated.

In a first step, pipes P are introduced into the respective pipe connections 101a, b, such that the pipes P extend axially into the sleeves 103 of the coupling 102, as illustrated in FIG. 4.

The operator then begins to torque the fixings 159, which causes the end member or ring 131 and the intermediate member or ring 115 to be commonly displaced axially inwardly. This common displacement is achieved by the supports 151 which ensure that the end member or ring 131 and the intermediate member or ring 115 are maintained with a predetermined spaced relation in an initial phase of torquing.

With displacement of the intermediate member or ring 115 in relation to the sleeve 103, the sealing element or gasket 111 is displaced and compressed, such as to be brought into tight sealing engagement with an outside diameter of the pipe P and an inner peripheral wall 106 of the end 105 of the sleeve 103, as illustrated in FIG. 5.

Following this compression of the sealing element or gasket 111, and, on the continued torquing of the pipe coupling, the torquing force increases, and on the application of a predetermined force, greater than would be required to displace and compress the sealing element or gasket 111, the supports 151 are compressed, causing the end member or ring 131 to be displaced in relation to the intermediate member or ring 115. This displacement of the end member or ring 131 in relation to the intermediate member or ring 115 causes radially-inward displacement and compression of the gripping element or ring 123 by the application of the face 135 of the end member or ring 131 against the second face 129 of the gripping element or ring 123, bringing the gripping element or ring 123 into firm gripping engagement with an outside diameter of the pipe P, as illustrated in FIG. 6.

With this arrangement, under all normally-expected conditions, the sealing element or gasket 111 is brought into sealing engagement with an outside diameter of the pipe P before the gripping element or ring 123 grips an outside diameter of the pipe P, thereby avoiding the possibility of gripping the pipe P ahead of proper sealing by the sealing element or gasket 111. Furthermore, the operator is provided with a direct visual indication of the proper operation of the pipe connection 101a, b, by the gap between the end 105 of the sleeve 103 and the projections 122 of the intermediate member or ring 115 being first closed, as illustrated in FIG. 5, and then subsequently the gap between the end member or ring 131 and the intermediate member or ring 115 being closed, as illustrated in FIG. 6.

Figure 7:
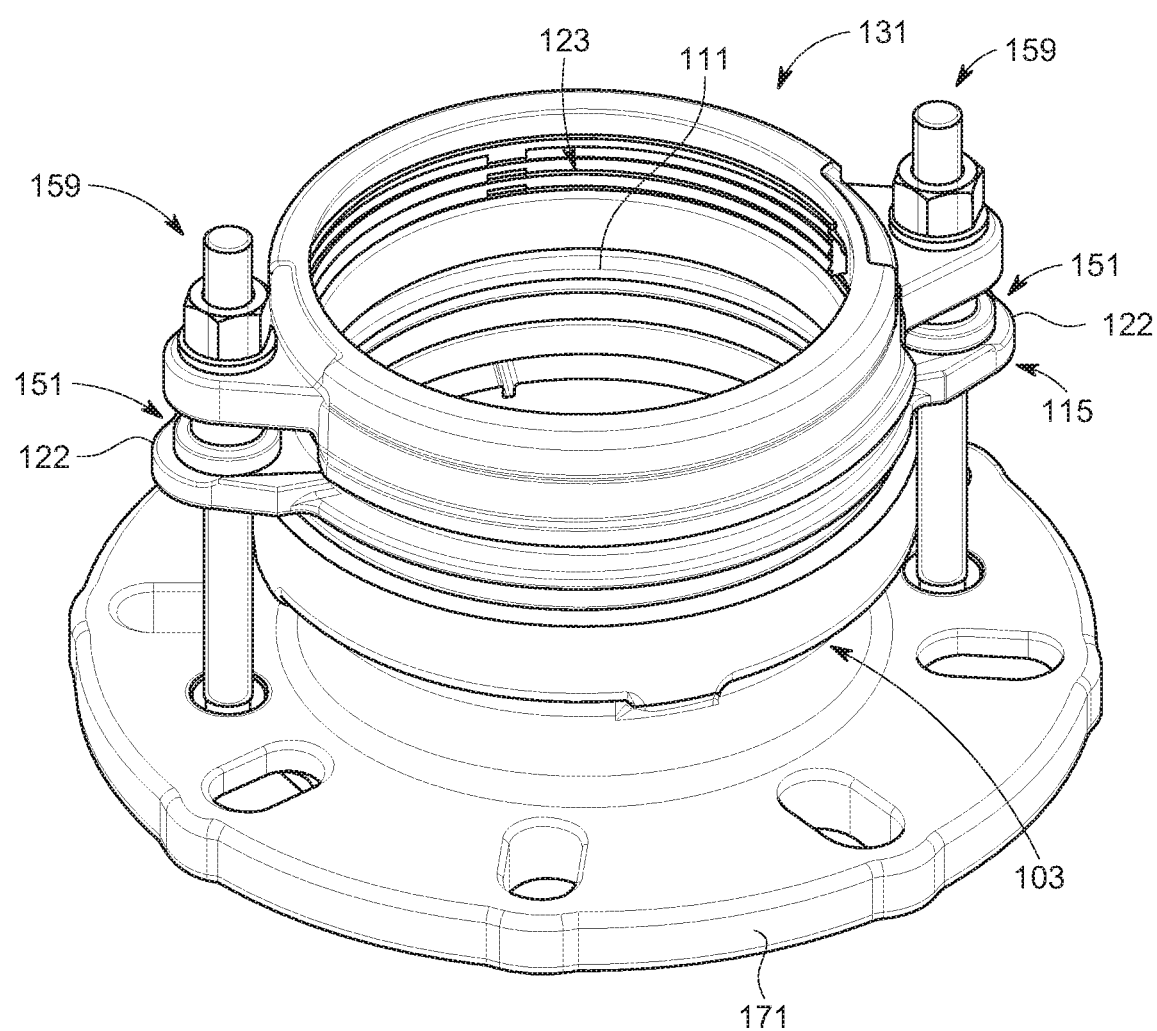
FIG. 7 illustrates a flange adaptor in accordance with a second embodiment of the present invention.
Figure 8:
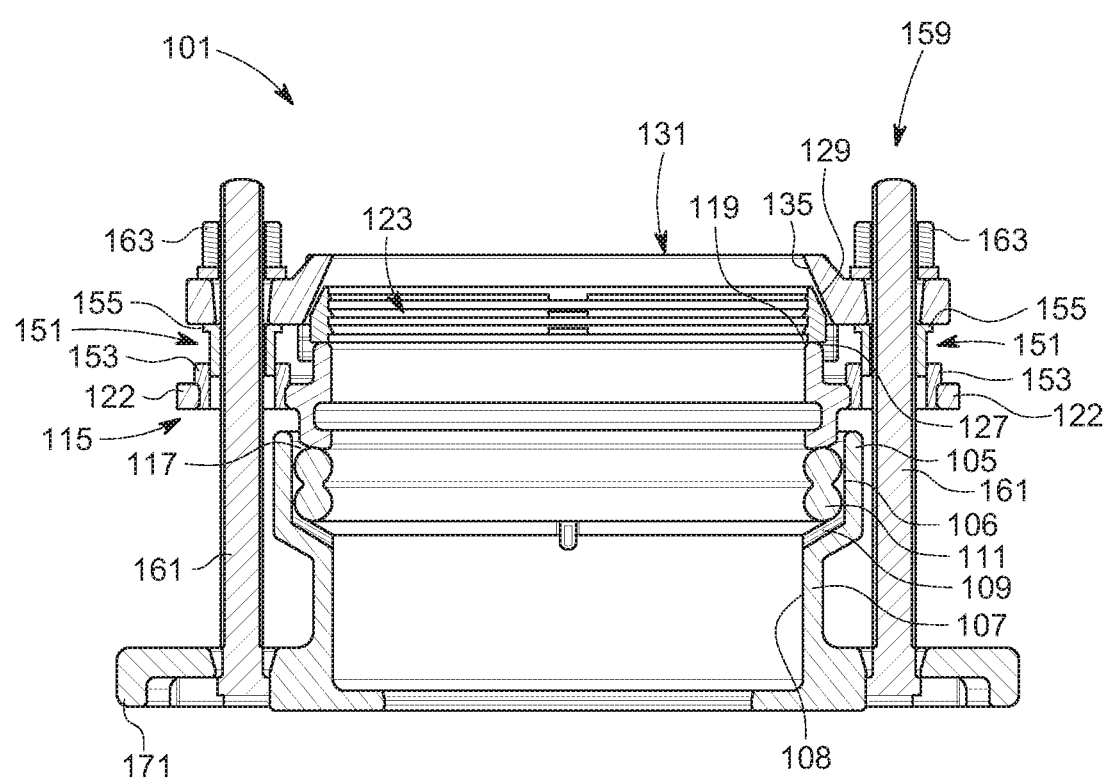
FIG. 8 illustrates a longitudinal sectional view of the pipe coupling of FIG. 7.

FIGS. 7 and 8 illustrate a flange adaptor in accordance with a second embodiment the present invention.

The flange adaptor of this embodiment is very similar to the pipe coupling of the above-described embodiment, except in having a flange 171 in place of one of the pipe connections 101a, b, with the fixings 159 being coupled between the end member or ring 131 of the one pipe connection 101 and the flange 171. In order to avoid unnecessary duplication of description, like parts are identified by like reference signs.

Figure 9:
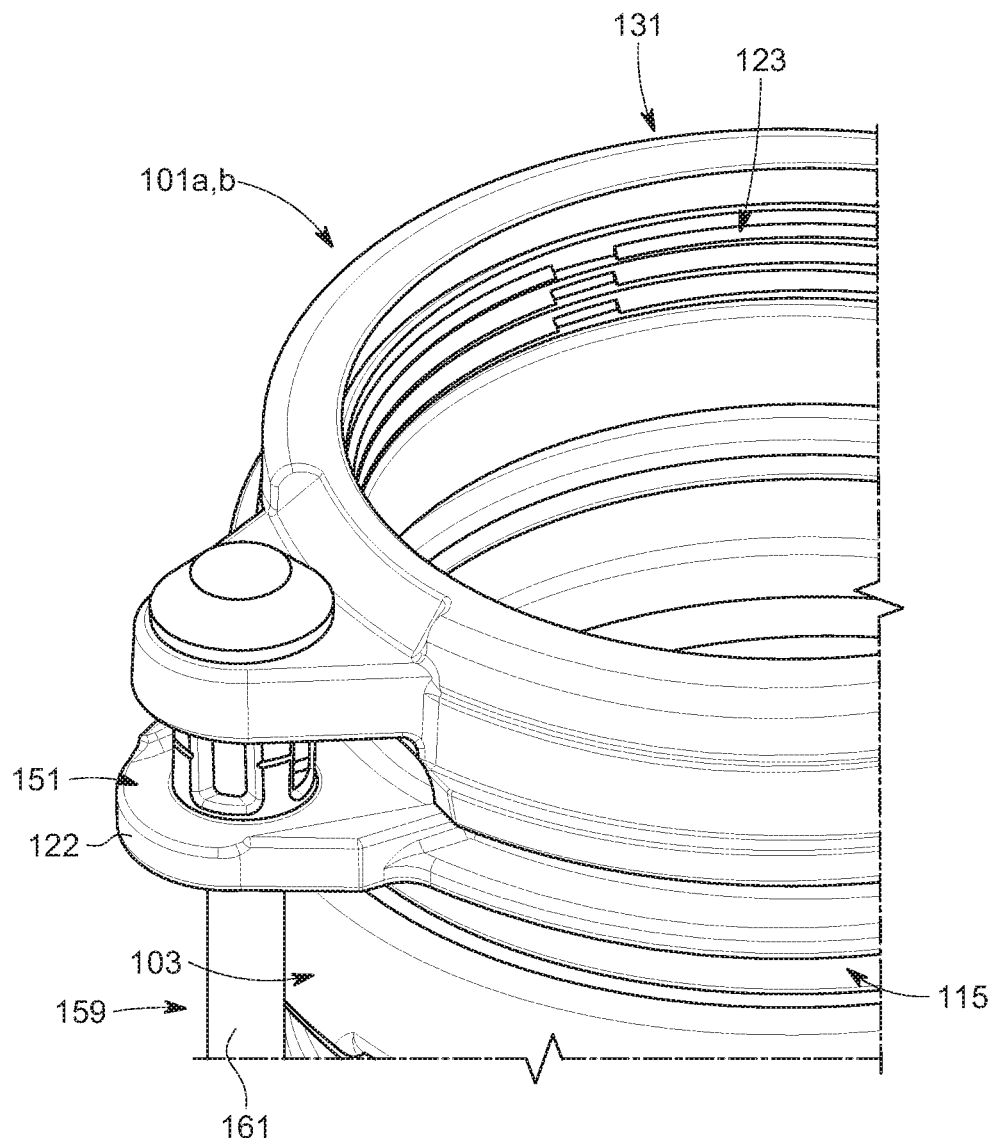
FIG. 9 illustrates a fragmentary view of a pipe coupling in accordance with a third embodiment of the present invention.
Figure 10:
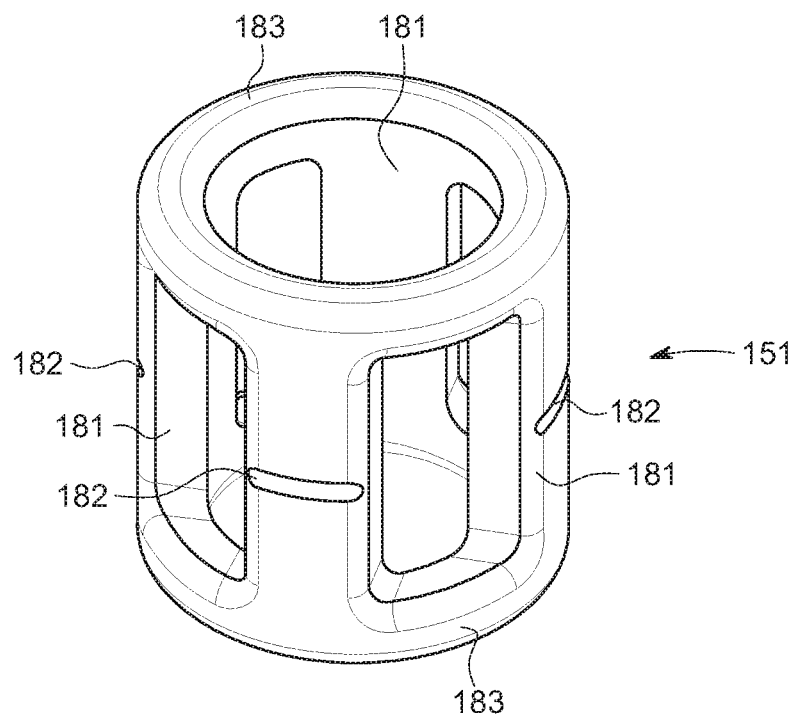
FIG. 10 illustrates one of the supports of the pipe coupling of FIG. 9.

FIGS. 9 and 10 illustrate a pipe coupling in accordance with a third embodiment of the present invention.

The pipe coupling of this embodiment is very similar to the pipe coupling of the first-described embodiment, and thus, in order to avoid unnecessary duplication of description, only the differences will be described in detail, with like parts being designated by like reference signs.

This embodiment differs from the first-described embodiment in the construction of the supports 151.

In this embodiment the supports 151 are configured to collapse when compressed, and not be compressed by sliding of parts.

In this embodiment the supports 151 each comprise at least one, here a plurality of struts 181, which collapse, here by buckling, when overloaded, on the application of a force which is greater than a predetermined value. In this embodiment the struts 181 have the form of a Chinese lantern.

In this embodiment the struts 181 extend in substantially-parallel relation to the compressive force applied by the fixings 159.

In this embodiment the struts 181 each include a weakened section 182, such as to ensure that the struts 181 collapse in a controlled manner.

In this embodiment the supports 151 each comprise at least one body element 183, here in the form of an annular ring, from which the struts 181 extend, with a respective fixing 159 extending through the body element 183, such as to hold the support 151 captive.

In this embodiment the supports 151 each comprise first and second body elements 183, here at opposite ends thereof, between which the struts 181 extend.

In this embodiment the supports 151 are each formed as an integral component, here a moulded engineering plastics component.

Figure 11:
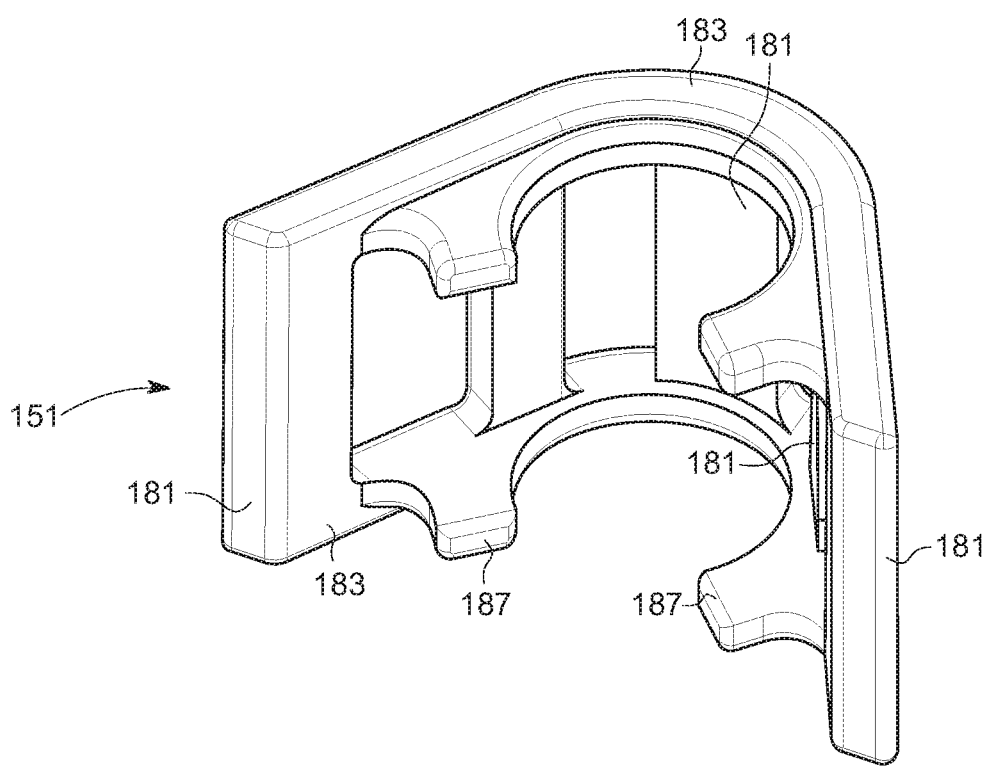
FIG. 11 illustrates a modified support for the pipe coupling of FIG. 9.

FIG. 11 illustrates a support 151 as one modification of the above-described support 151.

In this modification, the body element 183 of the support 151 is formed with an open section, which allows for fitting of the support 151 subsequent to the fitting of the fixings 159.

In this embodiment the body element 183 includes at least one, here two detents 187 which allow for a snap fit of the support 151 to the bolt 161, with the support 151 being retained captive by the detents 187.

Figure 12:
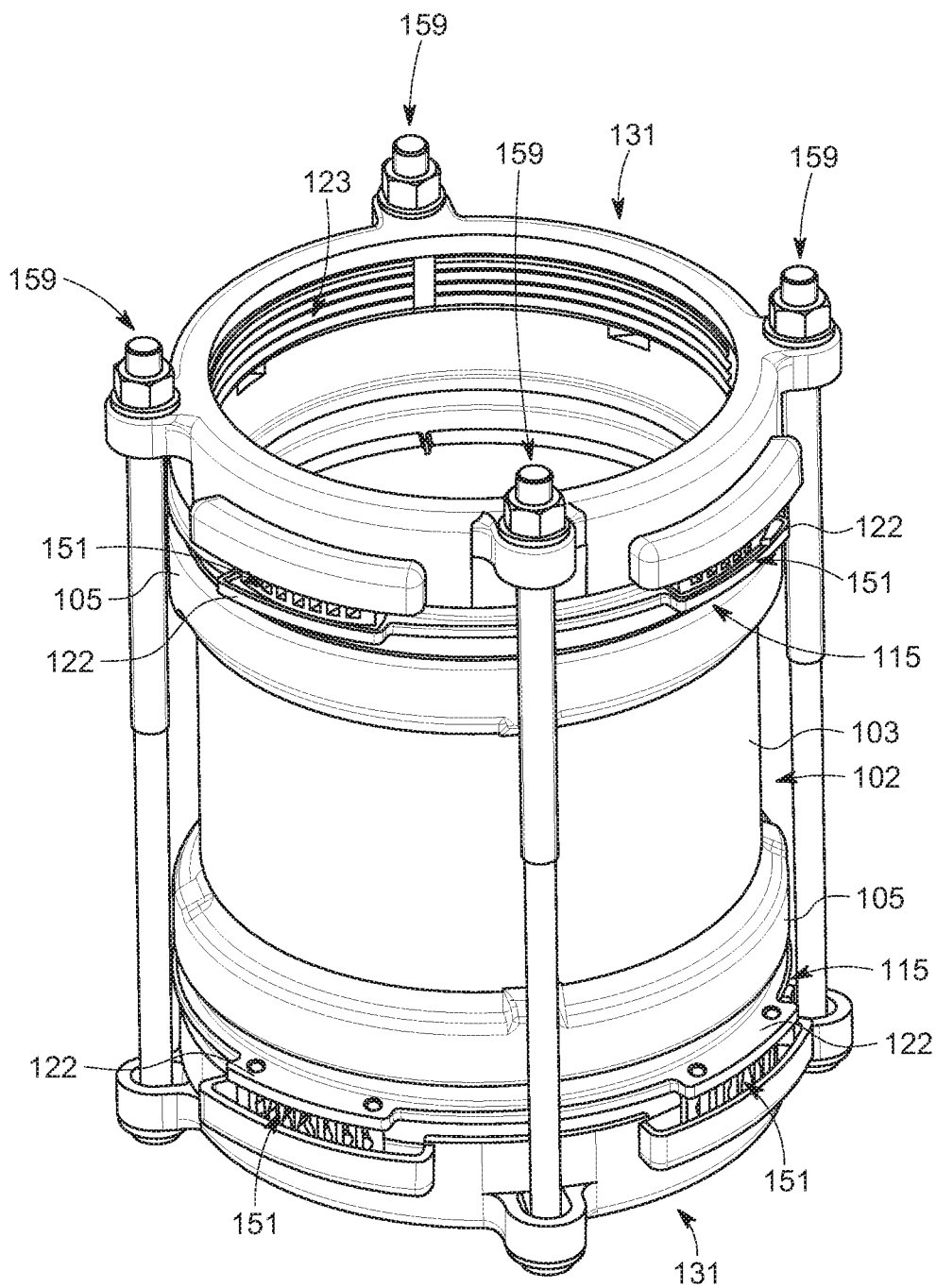
FIG. 12 illustrates a pipe coupling in accordance with a fourth embodiment of the present invention.
Figure 13:
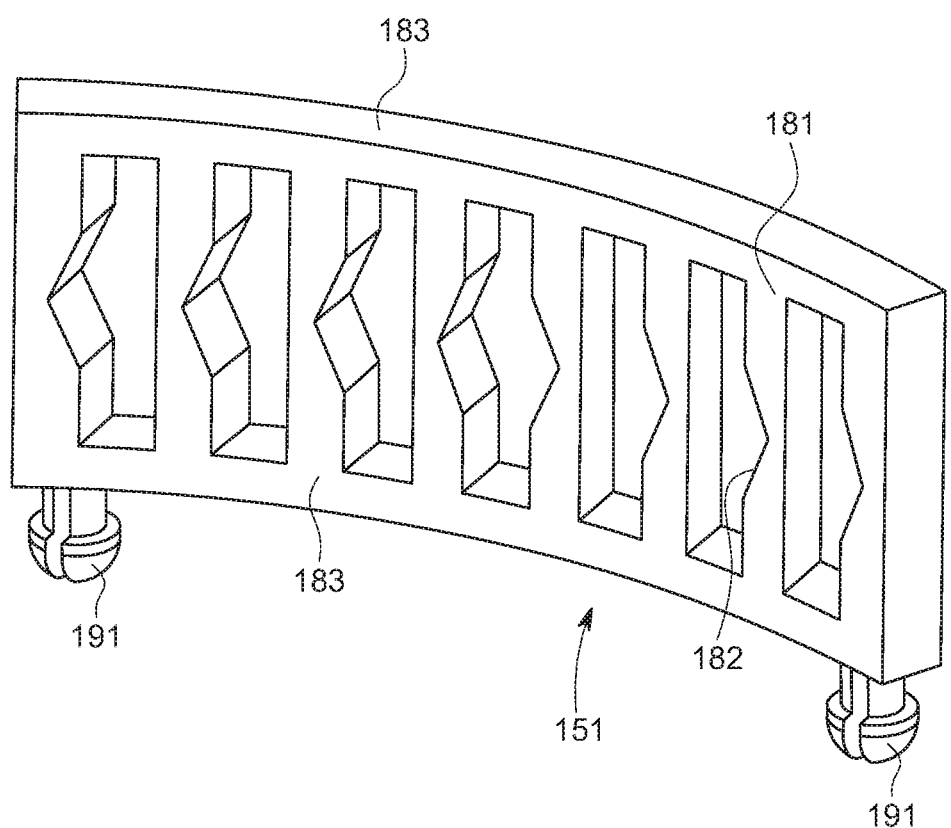
FIG. 13 illustrates one of the supports of the pipe coupling of FIG. 12.

FIGS. 12 and 13 illustrate a pipe coupling in accordance with a fourth embodiment of the present invention.

The pipe coupling of this embodiment is quite similar to the pipe coupling of the first-described embodiment, and thus, in order to avoid unnecessary duplication of description, only the differences will be described in detail, with like parts being designated by like reference signs.

This embodiment differs from the first-described embodiment in the configuration of the supports 151.

In this embodiment the supports 151 are not located around or adjacent the fixings 159, but are located separately thereof between opposing surfaces of the intermediate member or ring 115 and the end member or ring 131, and are configured to collapse when compressed, and not compress by sliding of parts.

In this embodiment the supports 151 each comprise at least one, here a plurality of struts 181, which collapse, here by buckling, on the application of a force which is greater than a predetermined value.

In this embodiment the struts 181 each include a weakened section 182, such as to ensure that the struts 181 collapse in a controlled manner.

In this embodiment the struts 181 extend in substantially-parallel relation to the compressive force applied by the fixings 159.

In this embodiment a plurality of the struts 181 are arranged in spaced, parallel relation, in the manner of a picket fence, about part of a periphery of the pipe connection 101a, b.

In this embodiment the pipe connections 101a, b include four supports 151 which are disposed in symmetrical relation about the intermediate member or ring 115. In another embodiment the pipe connections 101a, b could include any number of supports 151, including two or more.

In this embodiment the supports 151 each comprise at least one body member 183, here in the form of a part-annular ring, from which the struts 181 extend.

In this embodiment the supports 151 each comprise first and second body elements 183, here at opposite ends thereof, between which the struts 181 extend.

In this embodiment the supports 151 include at least one, here a plurality of attachments 191, here resilient clip-type attachments, by which the support 151 is attached to the intermediate member or ring 115.

In this embodiment the supports 151 are each formed as an integral component, here a moulded engineering plastics component.

Finally, it will be understood that the present invention has been described in its preferred embodiments and can be modified in many different ways without departing from the scope of the invention as defined by the appended claims.

In an alternative embodiment the supports 151 could include a biasing element between the parts 153, 155, such as to require the application of a predetermined force to cause sliding of the same.

In another embodiment the supports 151 could be formed as a compressible structure, for example, of a foamed or honeycomb structure, such as to require the application of a predetermined force to cause compression of the same.

In the described embodiment the supports 151 are formed of a plastics material, but could alternatively be formed of a metal or metallic material, such as steel, stainless steel, aluminum or copper.

In addition, the present invention has been described in relation to an application which requires a delayed action between a sealing element or gasket 111 and a gripping element or ring 123. However, the present invention can extend to application between any two components, which can be other than a sealing gasket or a gripper ring, and in one application can be the same kind of component.

Furthermore, the present invention has been described in relation to an application which requires a delayed action between a sealing element or gasket 111 and a gripping element or ring 123, with the action of the gripping element or ring 123 being delayed by operation of the supports 151. In an alternative embodiment the supports 151 could be disposed between the sleeve 103 and the intermediate member or ring 115, such that the action of the sealing element or gasket 111 is delayed in relation to the gripping element or ring 123 by operation of the supports 151

The invention claimed is:

1. A pipe connection for providing a connection to a pipe, the pipe connection comprising:
   a sleeve which receives a pipe and has a seat;
   a first sealing element or first gripping element which is disposed adjacent the seat;
   an intermediate member which is disposed adjacent the first sealing element or first gripping element;
   a second sealing element or second gripping element which is disposed adjacent the intermediate member;
   an end member which is disposed adjacent the second sealing element or second gripping element;
   a plurality of fixings which engages the end member and is configured to displace the same axially inwardly relative to the sleeve on tightening; and
   a plurality of supports which are disposed between one of the sleeve and the intermediate member or the intermediate member and the end member;
   wherein the supports are configured to maintain the sleeve and the intermediate member or the intermediate member and the end member with a predetermined spaced relation until application of a torquing force between the sleeve and the intermediate member or the intermediate member and the end member which exceeds a predetermined threshold, whereby the end member is displaced relative to the intermediate member to displace the second sealing, element or second gripping element ahead of displacement of the intermediate member relative to the sleeve to displace the first sealing element or first gripping element or the intermediate member is displaced relative to the sleeve to displace the first sealing element or first gripping element ahead of displacement of the end member relative to the intermediate member to displace the second sealing element or second gripping element;
   wherein the supports are located around the respective fixings, with the fixings extending through the supports.

2. The pipe connection of claim 1, wherein the seat faces axially outwardly, the intermediate member has a first face which faces axially inwardly and engages the first sealing element or first gripping element and a second face which faces axially outwardly and engages the second sealing element or second gripping element, and the end member has a face which faces axially inwardly and engages the second sealing element or second gripping element.

3. The pipe connection of claim 1, wherein
   (i) the first sealing, element or first gripping element is a sealing element which provides for sealing engagement with the pipe; or
   the first sealing element or first gripping element is a gripping element which provides for gripping engagement with the pipe.

4. The pipe connection of claim 1, wherein the supports are disposed between the intermediate member and the end member, wherein the supports are configured to maintain the intermediate member and the end member with a predetermined spaced relation until application of a torquing force between the intermediate member and the end member which exceeds a predetermined threshold, whereby the intermediate member is displaced relative to the sleeve to displace the first sealing element or first gripping element ahead of displacement of the end member relative to the intermediate member to displace the second sealing element or second gripping element.

5. The pipe connection of claim 1, wherein the supports are configured to shorten axially when a torquing force is applied thereto which exceeds a predetermined threshold.

6. The pipe connection of claim 5, wherein the supports:
   (i) are deformable structures;
   (ii) are configured to collapse or buckle;
   (iii) comprise one or more struts; and/or
   (iv) comprise one or more struts which buckle on the application of a force which is greater than a predetermined value.

7. The pipe connection of claim 6, wherein
   (i) the at least one support comprises a body member from which extends one end of the one or more struts, with the other ends of the one or more struts being unconnected; or
   (ii) a body member from which extends the one or more struts.

8. The pipe connection of claim 6, wherein the one or more struts:
   (i) extend in substantially-parallel relation to a force applied by the fixings; and/or
   (ii) include a weakened section so as to ensure that the one or more struts collapse in a controlled manner.

9. The pipe connection of claim 7, wherein each body member has an open section and allows for fitting of the respective support subsequent to the fitting of the fixings.

10. The pipe connection of claim 1, wherein the supports:
    (i) are formed as an integral component; or
    (ii) comprises a compressible material.

11. The pipe connection of claim 1, wherein the supports each comprises a slideable structure.

12. The pipe connection of claim 11, wherein supports each comprise first and second parts which are configured to allow for relative displacement only when a force, as achieved by tightening of the pipe connection, exceeds a predetermined threshold.

13. The pipe connection of claim 1, wherein:
    the seat encloses an acute angle with an outside diameter of a pipe, such that, on tightening of the pipe connection, the first sealing element or first gripping element is driven into engagement with an outside diameter of the pipe;
    the intermediate member (i) encloses an obtuse angle with an outside diameter of a pipe, such that, on tightening of the pipe connection, the first sealing element or first gripping element is driven outwardly into engagement with an inner peripheral wall of an end of the sleeve, and/or (ii) includes at least one radial projection which engages the support; and/or the end member encloses an acute angle with an outside diameter of a pipe, such that, on tightening of the pipe connection, the second sealing element or second gripping element is driven radially inwardly into engagement with an outer diameter of the pipe.

14. The pipe connection of claim 1, wherein:
the fixings comprises a connector bolt and a nut;
the intermediate member comprises an intermediate ring;
the end member comprises an end ring; and/or
one or both of the first sealing element or first gripping element or the second sealing element or second gripping element comprises a double O-ring.

15. The pipe connection of claim 1, wherein the supports are configured to shorten at a predeterminable rate so as to maintain a load on one of the first sealing element or first gripping element or the second sealing element or second gripping element during subsequent displacement of the other of the first sealing element or first gripping element or the second sealing element or second gripping element.

16. The pipe connection of claim 1, wherein the supports are configured to provide a varying resistance during shortening, whereby the first sealing element or first gripping element or the second sealing element or second gripping element maintains engagement with the pipe during subsequent tightening of the pipe connection to displace the other of the first sealing element or first gripping element or the second sealing element or second gripping element.

17. The pipe connection of claim 1, wherein:
(i) the second sealing element or second gripping element is a sealing element which provides for sealing engagement with the pipe; or
(ii) the second sealing element or second gripping element is a gripping element which provides for gripping engagement with the pipe.

18. The pipe connection of claim 1, wherein the first sealing element or first gripping element is a sealing ring and the second sealing element or second gripping element is a gripping ring.

* * * * *